US011619509B2

(12) United States Patent
Sharma et al.

(10) Patent No.: US 11,619,509 B2
(45) Date of Patent: Apr. 4, 2023

(54) METHOD AND SYSTEM FOR TRIP CLASSIFICATION

(71) Applicant: Tata Consultancy Services Limited, Mumbai (IN)

(72) Inventors: Varsha Sharma, Kolkata (IN); Arijit Chowdhury, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 99 days.

(21) Appl. No.: 17/029,199

(22) Filed: Sep. 23, 2020

(65) Prior Publication Data
US 2021/0148718 A1 May 20, 2021

(30) Foreign Application Priority Data

Oct. 9, 2019 (IN) .............................. 201921040833

(51) Int. Cl.
*G01C 21/34* (2006.01)
*G01C 21/00* (2006.01)
(Continued)

(52) U.S. Cl.
CPC ..... *G01C 21/3492* (2013.01); *G01C 21/3691* (2013.01); *G01C 21/3807* (2020.08);
(Continued)

(58) Field of Classification Search
CPC ............ G01C 21/3492; G01C 21/3807; G01C 21/3691; G01S 19/42
See application file for complete search history.

(56) References Cited

U.S. PATENT DOCUMENTS 8,260,515 B2   9/2012 Huang et al.
10,198,772 B2  2/2019 Parameshwaran
(Continued)

FOREIGN PATENT DOCUMENTS

WO   WO-2014014470 A1 * 1/2014 ............. G06N 5/048

OTHER PUBLICATIONS

Quek, C., Pasquier, M., & Lim, B. B. S. (2006). Pop-Traffic: A novel fuzzy neural approach to road traffic analysis and prediction. IEEE transactions on intelligent transportation systems, 7(2), 133-146. (Year: 2006).*
(Continued)

*Primary Examiner* — Ig T An
*Assistant Examiner* — Stephanie T Su
(74) *Attorney, Agent, or Firm* — Finnegan, Henderson, Farabow, Garrett & Dunner LLP

(57) ABSTRACT

Reckless behavior of drivers like, speeding, sudden acceleration and swerving through lanes can cause fatality and financial loss. Conventional methods mainly focus on driving style classification. The conventional methods mainly focus on driver classification and are not able to provide trip classification of a driver. Hence there is a challenge in trip classification of the driver based on acceleration data. The present disclosure for trip classification addresses the problem of end to end trip classification based on the acceleration data. Here, a journey is segmented into a plurality of sub-journey segments and each sub-journey segment is associated with a plurality of driving events. An event score is calculated for each sub-journey and a normalization is performed on the event score. Further, the journey is classified into at least one of good, average or bad based on the normalized data by utilizing a fuzzy based classification.

3 Claims, 6 Drawing Sheets

(51) Int. Cl.
*G01C 21/36* (2006.01)
*G01S 19/42* (2010.01)
*G08G 1/01* (2006.01)

(52) U.S. Cl.
CPC ............ *G01S 19/42* (2013.01); *G08G 1/0129* (2013.01); *G08G 1/0133* (2013.01); *G08G 1/0137* (2013.01)

(56) References Cited

U.S. PATENT DOCUMENTS

| | | | | |
|---|---|---|---|---|
| 2005/0131597 | A1* | 6/2005 | Raz | G09B 19/167 701/29.1 |
| 2006/0149472 | A1* | 7/2006 | Han | G05D 1/0278 701/14 |
| 2018/0281796 | A1* | 10/2018 | Ravichandran | B60W 50/0098 |

OTHER PUBLICATIONS

Author: Ahmad Aljaafreh, Nabeel Alshabatat, and Munaf S. Najim Al-Din Title: Driving Style Recognition Using Fuzzy Logic Title of the item: Driving performance classification Date: Jul. 2012 Publisher: Research Gate Link: https://www.researchgate.net/publication/261207287_Driving_style_recognition_using_fuzzy_logic/link/02e7e52ad8d5a9bae1000000/download.

Author: Vygandas Vaitkus and Paulius Lengvenis, Gediminas Žylius Title: Driving Style Classification using Long-Term Accelerometer Information Title of the item: Driving performance classification Date: Sep. 2014 Publisher: IEEE Link: https://www.researchgate.net/publication/285055790_Driving_Style_Classification_using_Long-Term_Accelerometer_Information/link/565b556a08aeafc2aac61bcc/download.

* cited by examiner

METHOD AND SYSTEM FOR TRIP CLASSIFICATION

PRIORITY CLAIM

This U.S. patent application claims priority under 35 U.S.C. § 119 to: India Application No. 201921040833, filed on Oct. 9, 2019. The entire contents of the aforementioned application are incorporated herein by reference.

TECHNICAL FIELD

The disclosure herein generally relates to the field of classification, and, more particular, to a method and system for trip classification.

BACKGROUND

Vehicle accidents are common nowadays and large number of vehicle accidents are closely related to driver behavior and their driving styles. Vehicle accidents cause fatalities and injuries, financial losses and lost productivity. They also result in legal and insurance costs. Reckless behavior of the driver like, speeding, sudden acceleration and swerving through lanes put other drivers also at risk. Surveys shows that recognizing dangerous driving behavior can be a strong motivator for drivers to improve their driving behavior. However, recognizing the dangerous behavior is a challenging task. However, the safety of a trip can be assessed by referring to classified trips of the driver if any and the driver can improve his further driving style based on that.

Conventional methods mainly focus on driving style classification. The conventional driving style classification is either performed by using multiple sensor data or maneuver based classification. Further, the conventional methods are not able to provide trip classification of a driver and there is a challenge in classifying the trip of the driver based on acceleration data alone.

SUMMARY

Embodiments of the present disclosure present technological improvements as solutions to one or more of the above-mentioned technical problems recognized by the inventors in conventional systems. For example, in one embodiment, a method for trip classification is provided. The method includes receiving, a plurality of driving data pertaining to a journey from a plurality of Global Positioning System (GPS) sensors, wherein the plurality of driving data comprising a timestamp, a lateral acceleration of a vehicle, a longitudinal acceleration of the vehicle and a plurality of traffic information associated with the journey. The method further includes segmenting the journey into a plurality of sub-journeys based on the plurality of traffic information. Further, the method includes detecting a plurality of driving events for each of the plurality of sub-journeys based on the lateral and longitudinal acceleration. Further, the method includes computing an event score associated with each of the plurality of driving events corresponding to each sub-journey based on the driving data. Furthermore, the method includes normalizing the event score corresponding to the plurality of driving events based on a percentile mapping, wherein the percentile mapping is performed by comparing the event score and a global statistics. Finally, the method includes classifying, the journey into at least one of very good, good, average, bad and very bad, based on the normalized event score by utilizing fuzzy classification.

In another aspect, a system for trip classification is provided. The system includes a computing device wherein the computing device includes, at least one memory comprising programmed instructions, at least one hardware processor operatively coupled to the at least one memory, wherein the at least one hardware processor is capable of executing the programmed instructions stored in the at least one memories to receive a plurality of driving data pertaining to a journey from a plurality of Global Positioning System (GPS) sensors, wherein the plurality of driving data comprising a timestamp, a lateral acceleration of a vehicle, a longitudinal acceleration of the vehicle and a plurality of traffic information associated with the journey. Further, the one or more hardware processor is configured to segment the journey into a plurality of sub-journeys based on the plurality of traffic information. Further, the one or more hardware processor is configured to detect a plurality of driving events for each of the plurality of sub-journeys based on the lateral and longitudinal acceleration. Further, the one or more hardware processor is configured to compute an event score associated with each of the plurality of driving events corresponding to each sub-journey based on the driving data. Furthermore, the one or more hardware processor is configured to normalize the event score corresponding to the plurality of driving events based on a percentile mapping, wherein the percentile mapping is performed by comparing the event score and a global statistics. Finally, the one or more hardware processor is configured to classify, the journey into at least one of very good, good, average, bad and very bad, based on the normalized event score by utilizing fuzzy classification In yet another aspect, a computer program product comprising a non-transitory computer-readable medium having the trip analysis unit is configured to embodied therein a computer program for method and system for trip classification is provided. The computer readable program, when executed on a computing device, causes the computing device to receive a plurality of driving data pertaining to a journey from a plurality of Global Positioning System (GPS) sensors, wherein the plurality of driving data comprising a timestamp, a lateral acceleration of a vehicle, a longitudinal acceleration of the vehicle and a plurality of traffic information associated with the journey. Further, the computer readable program, when executed on a computing device, causes the computing device to segment the journey into a plurality of sub-journeys based on the plurality of traffic information. Further, the computer readable program, when executed on a computing device, causes the computing device to detect a plurality of driving events for each of the plurality of sub-journeys based on the lateral and longitudinal acceleration. Further, the computer readable program, when executed on a computing device, causes the computing device to compute an event score associated with each of the plurality of driving events corresponding to each sub-journey based on the driving data. Furthermore, the computer readable program, when executed on a computing device, causes the computing device to normalize the event score corresponding to the plurality of driving events based on a percentile mapping, wherein the percentile mapping is performed by comparing the event score and a global statistics. Finally, the computer readable program, when executed on a computing device, causes the computing device to classify, the journey into at least one of very good, good, average, bad and very bad, based on the normalized event score by utilizing fuzzy classification It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
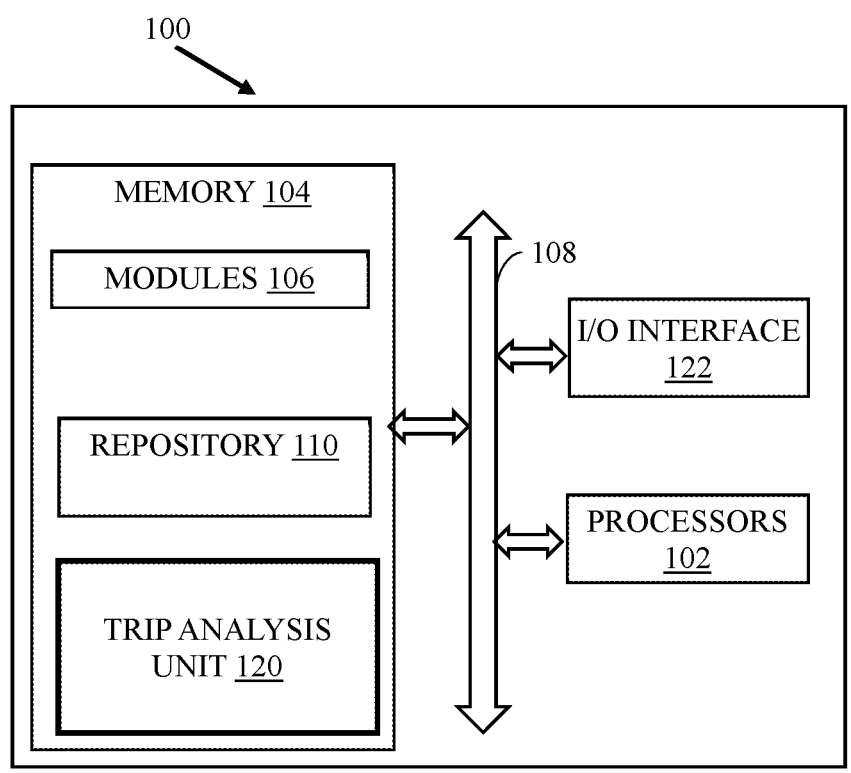
FIG. 1 is a functional block diagram of a system for trip classification, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. For brevity of description, the terms "trip" and "journey" are used interchangeably throughout the document.

Embodiments herein provide a method and system for trip classification. The system for trip classification classifies an end to end trip/journey of a driver into good or bad based on the global database. The system for trip classification addresses the problem of end to end trip classification based on acceleration data. Here, a journey is segmented into a plurality of sub-journey segments and each sub-journey segment is associated with a plurality of driving events. An event score is calculated for each sub-journey and a normalization is performed on the event score. Further, the journey is classified into at least one of good, average or bad based on the normalized data by utilizing a fuzzy based classification. The journey classification data can be further used by a subject to select a driver for a trip and the driver can improve his/her driving style based on the trip classification. An implementation of the method and system for trip classification is described further in detail with reference to FIGS. 1 through 6.

Referring now to the drawings, and more particularly to FIG. 1 through 6, where similar reference characters denote corresponding features consistently throughout the figures, there are shown preferred embodiments and these embodiments are described in the context of the following exemplary system and/or method.

FIG. 1 is a functional block diagram of a system for trip classification, according to some embodiments of the present disclosure. The system 100 includes or is otherwise in communication with one or more hardware processors, such as a processors 102, at least one memory such as a memory 104, an I/O interface 122. The memory 104 may include the trip analysis unit 120. The processor 102, memory 104, and the I/O interface 122 may be coupled by a system bus such as a system bus 108 or a similar mechanism.

The I/O interface 122 may include a variety of software and hardware interfaces, for example, a web interface, a graphical user interface, and the like. The I/O interface 122 may include a variety of software and hardware interfaces, for example, interfaces for peripheral device(s), such as a keyboard, a mouse, an external memory, a plurality of Global Positioning System (GPS) sensors, a printer and the like. Further, the I/O interface 122 may enable the system 100 to communicate with other devices, such as web servers and external databases.

The interface 122 can facilitate multiple communications within a wide variety of networks and protocol types, including wired networks, for example, local area network (LAN), cable, etc., and wireless networks, such as Wireless LAN (WLAN), cellular, or satellite. For the purpose, the interface 122 may include one or more ports for connecting a number of computing systems with one another or to another server computer. The I/O interface 122 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and a repository 110 for storing data processed, received, and generated by one or more of the modules 106 and the image analysis unit 120. The modules 106 may include routines, programs, objects, components, data structures, and so on, which perform particular tasks or implement particular abstract data types.

The memory 104 also includes a repository 110. The module(s) 106 include programs or coded instructions that supplement applications or functions performed by the system 100 for trip classification. The modules 106, amongst other things, can include routines, programs, objects, components, and data structures, which perform particular tasks or implement particular abstract data types. The modules 106 may also be used as, signal processor(s), state machine(s), logic circuitries, and/or any other device or component that manipulates signals based on operational instructions. Further, the modules 106 can be used by hardware, by computer-readable instructions executed by a processing unit, or by a combination thereof. The modules 106 can include various sub-modules (not shown). The modules 106 may include computer-readable instructions that supplement applications or functions performed by the system 100 for trip classification.

The repository 110 may include acceleration data, a global traffic database and other data. Further, the other data amongst other things, may serve as a repository for storing data that is processed, received, or generated as a result of the execution of one or more modules in the module(s) 106 and the modules associated with the trip analysis unit 120.

Although the repository 110 is shown internal to the system 100, it will be noted that, in alternate embodiments, the repository 110 can also be implemented external to the computing device 100, where the repository 110 may be stored within a database (not shown in FIG. 1) communicatively coupled to the computing device 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

The trip analysis unit 120, executed by the one or more hardware processors of the system 100, receives a plurality of driving data pertaining to the journey from a plurality of Global Positioning System (GPS) sensors. The plurality of driving data includes a timestamp, a lateral acceleration of a vehicle, a longitudinal acceleration of the vehicle and a plurality of traffic information associated with the journey.

Further, the trip analysis unit 120, executed by the one or more hardware processors of the system 100, segments the journey into a plurality of sub-journeys based on the plurality of traffic information. The plurality of traffic information includes a capacity of a road, heavy traffic hours, types of vehicles, number of vehicles, and vehicle density per unit length of road. In an embodiment, the plurality of traffic information is obtained from the global traffic database. For example, point A to point B on a road is considered as one complete journey A-B. The journey A-B is segmented into the plurality of sub-journeys (A-B1, B1-B2, . . . , B(N−1)-BN, BN-B, where N+1 is the number of segments). Each sub-journey is associated with a plurality of driving events.

Further, the trip analysis unit 120, executed by the one or more hardware processors of the system 100, detects the plurality of driving events for each of the plurality of sub-journeys based on the lateral and the longitudinal acceleration. The plurality of driving events includes a lane change, an abrupt turning and an overtake.

Further, the trip analysis unit 120, executed by the one or more hardware processors of the system 100, computes an event score (m1) associated with each of the plurality of driving events corresponding to each sub-journey based on the driving data. The event score (m1) is calculated based on the number of each event (number of times an event occurs) corresponding to a sub-journey. For example, the trip/journey AB is segmented into 5 sub-journey A-B1, B1-B2, B2-B3, B3-B4, B4-B. Out of which 2 sub-journeys belong to Turning event and 3 sub-journeys belong to lane changing event according to global database. The lane changing event score for the sub-journey A-B1 can be 3, wherein the lane changing event score 3 indicates that, there are 3 lane changes happened in the sub-journey A-B1. The score associated with each driving event is mapped according to number of Turnings and lane changing performed by the subject driver on journey AB.

Further, the trip analysis unit 120, executed by the one or more hardware processors of the system 100, normalizes the event score (m1) corresponding to the plurality of driving events based on a percentile mapping. The percentile mapping is performed by comparing the event score and global statistics.

In an embodiment, the normal distribution F1 ($\mu=x1$, $\sigma=y1$) for Lane Change event taken from the global database with (x1) number of average lane changes and (y1) standard deviation. The lane change indicates a series of moves taken while driving through a sub-journey with required skill and attention. The terms "segment" and "sub-journey" are used interchangeably throughout the document. The subject (driver) performs an average (x2) lane changes with (y2) deviation during the journey normally distributed in F2 ($\mu=x2$, $\sigma=y2$). Further, a comparison is performed between the data captured during surveys (F2) and the global statistics (F1). For example, (m1) is the original score of lane changing by subject (D1) in F1, which has a z-score (z1)= (m1−x1)/y1. The z1 is mapped in F2 designed from the surveys to obtain the percentile score $(p)=(z1*y2)_+ x2$. The mapping provides the relative feasibility and comparison of (m1) in F2 for fuzzy classification. Similarly, the score (p) for other two events Turning and Overtake in same sub-journey is calculated and (p) is rounded off to get the exact number of lane changes in F2 mapping.

There are 2 cases that are possible based on value of (p):

Case 1: If (p) is less than (m1), then (p) is taken as the percentile score without any modification.

Case 2: If (p) is greater than (m1), then we have incorporated Gaussian noise in the data to adjust the number of lane changes.

In an example embodiment, there are two normal distributions one from the global database as depicted in Table 1 and from the drivers (driving survey data from GPS) as depicted in Table 2.

TABLE 1

| Driving Events (F1) | Mu(x1) | Sigma(y1) |
| --- | --- | --- |
| Lane Changing | 6 | 3 |
| Turning | 7 | 2 |
| Overtake | 2 | 1 |

TABLE 2

| Driving Events (F2) | Mu(x2) | Sigma(y2) |
| --- | --- | --- |
| Lane Changing | 3 | 2 |
| Turning | 7 | 3 |
| Overtake | 4 | 1 |

Case1: Let, driver D1 perform number of lane changes, m1=5 in Segment S1.
From Table 1, Row1: z1=(5−6)/3=−0.33
From Table 2, Row1: p=(−0.33*2)+3=2.33=2 (Rounded off).
Since p<m1, Taken as it is.
Case2: Let, driver D1 perform number of turns, m1=7 in Segment S1.
From Table 1, Row2: z1=(7−7)/2=0
From Table 2, Row2: p=(0*3)+7=7
Since p=m1, Taken as it is.
Case3: Let, driver D1 performs number of overtakes, m1=3 in Segment S1.
From Table 1, Row3: z1=(3−2)/1=1
From Table 2, Row3: p=(1*1)+4=5
Since p>m1, Gaussian noise is introduced to adjust p.

The similar analysis is performed for all sub-journeys. The overall acceleration ABNew for the complete journey is calculated by merging data associated with all sub-journey together. The calculation is performed separately on both lateral acceleration and longitudinal acceleration.

Further, the trip analysis unit 120, executed by the one or more hardware processors of the system 100, classifies, the journey into at least one of very good, good, average, bad and very bad, based on the normalized event score by utilizing fuzzy inference system.

In an embodiment, a plurality of inputs for the fuzzy inference system are defined. For example, the input H.BRAKE (p) depicts the percentage of harsh brakes in the trip, CRUISE (q) depicts the percentage of trip travelled smoothly at an economical speed and H.ACC(r) depicts the percentage of harsh driving in the trip. Output of the present fuzzy inference system is represented as JOURNEY.TY P (V) which depicts the overall quality of driving in the whole journey (trip).

In an embodiment, fuzzification is performed on the plurality of inputs. The fuzzification includes mapping of the plurality of inputs to the corresponding linguistic variables. The linguistic variables are given by fuzzy sets as. H.BRAKE=[L, M, H], CRUISE=[L, M, H] and H.ACC=[L, M, H], where L=Low, M=Medium and H=High. Further, the linguistic variables break down the crisp values in a plurality of linguistic variable ranges between 0 and 1. The plurality of linguistic variable ranges are further associated with a certain degree of membership.

Figure 2:
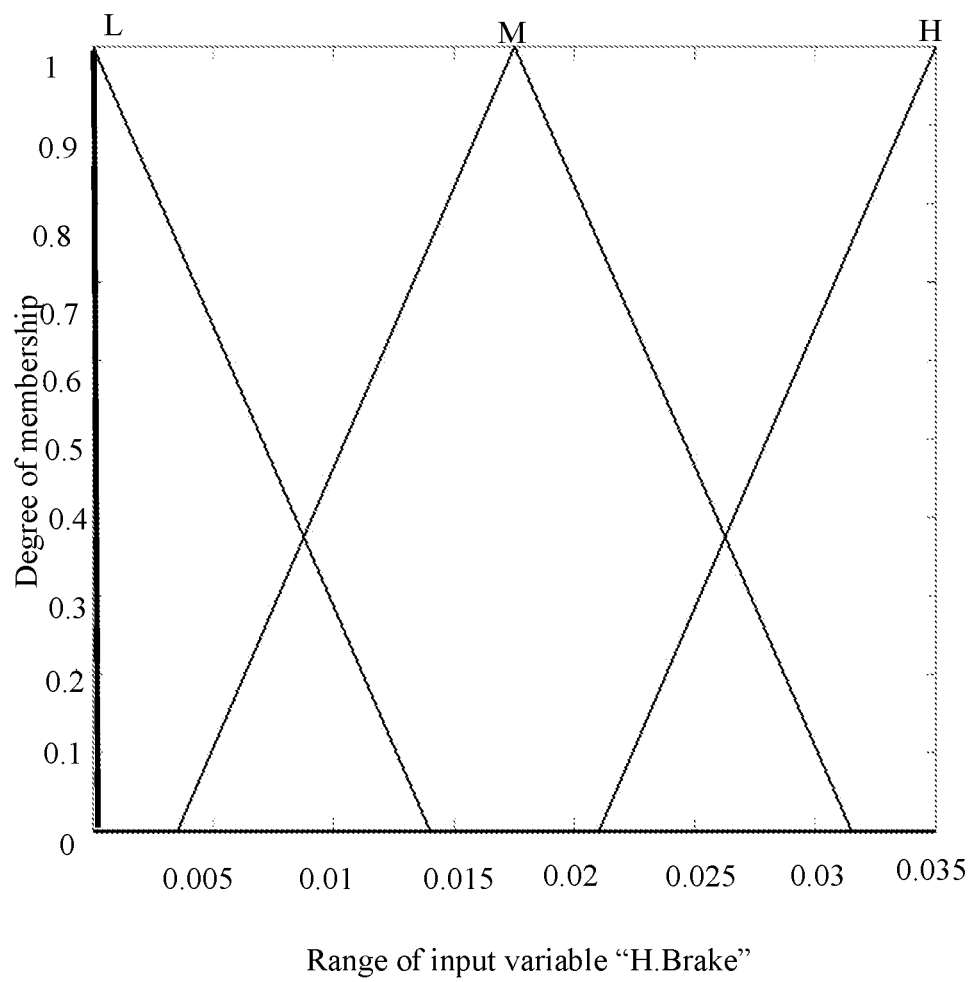
FIGS. 2 and 3 depicts membership function plot for a method of trip classification, in accordance with some embodiments of the present disclosure.

In an embodiment, the representation of inputs are performed by triangular membership function. FIG. 2 depicts membership function plot for the input variable H.BRAKE for the method of trip classification, in accordance with some embodiments of the present disclosure. Other two inputs are represented in a similar manner as the first input H.BRAKE.

In an embodiment, the Linguistic variables in all the fuzzy sets with their respective fuzzy numbers are depicted in Table 3.

TABLE 3

| Inputs | LOW | Medium | High |
|---|---|---|---|
| H.BRAKE | 0, 0, 0.014 | 0.0035, 0.0175, 0.0315 | 0.021, 0.035, 0.035 |
| CRUISE | 0.75, 0.75, 0.85 | 0.775, 0.875, 0.975 | 0.9, 1, 1 |
| H.ACC | 0, 0, 0.014 | 0.0035, 0.0175, 0.0315 | 0.021, 0.035, 0.035 |

TABLE 4

| Rule No. | H.BRAKE | CRUISE | H.ACC | JOURNEY.TY P |
|---|---|---|---|---|
| 1 | L | L | L | AVG |
| 2 | L | L | M | AVG |
| 3 | L | L | H | AVG |
| 4 | L | M | L | AVG |
| 5 | L | M | M | AVG |
| 6 | L | M | H | AVG |
| 7 | L | H | L | VG |
| 8 | L | H | M | G |
| 9 | L | H | H | AVG |
| 10 | M | L | L | AVG |
| 11 | M | L | M | AVG |
| 12 | M | L | H | B |
| 13 | M | M | L | AVG |
| 14 | M | M | M | AVG |
| 15 | M | M | H | AVG |
| 16 | M | L | H | G |

TABLE 4-continued

| Rule No. | H.BRAKE | CRUISE | H.ACC | JOURNEY.TY P |
|---|---|---|---|---|
| 17 | M | H | M | AVG |
| 18 | M | H | H | AVG |
| 19 | H | L | L | AVG |
| 20 | H | L | M | B |
| 21 | H | L | H | VB |
| 22 | H | M | L | AVG |
| 23 | H | M | M | AVG |
| 24 | H | M | H | AVG |
| 25 | H | H | L | AVG |
| 26 | H | H | M | AVG |
| 27 | H | H | H | AVG |

Table 4 depicts a rule base. In an embodiment, rule-base for the system 100 is constructed on the basis of general experience and the common sense of a user. Rules are constructed as "If" and "Then" statements. For example, rule 1 from 1st row of Table 4 is like "If H.BRAKE is Low and CRUISE is Low and H.ACC is Low, then JOURNEY.TY P is AVG(Average)". Similarly, a plurality of rules are derived. The plurality of rules are combined by using the logic operator "AND" which means the "Minimum". Hence, firing strength of each rule is defined by the minimum of the three input membership values. The consequence of each rule is obtained by combining the firing strength and the output membership function, aggregation of all 2 the consequences will produces the output distribution. The defuzzification of output distribution is done by centroidal method which provide the crisp value of the output.

In an embodiment, the output fuzzy set is defined as JOURNEY.TY P=[VG=VeryGood, G=Good, AVG=Average, B=Bad, VB=VeryBad], and fuzzy numbers for all variables represented by triangular membership function are provided in Table 5.

TABLE 5

| Output | VG | G | AVG | B | VB |
|---|---|---|---|---|---|
| JOURNEY.TY P | 0, 0, 0.25 | 0, 0.25, 0.5 | 0.25, 0.5, 0.75 | 0.5, 0.75, 1 | 0.75, 1, 1 |

Figure 3:
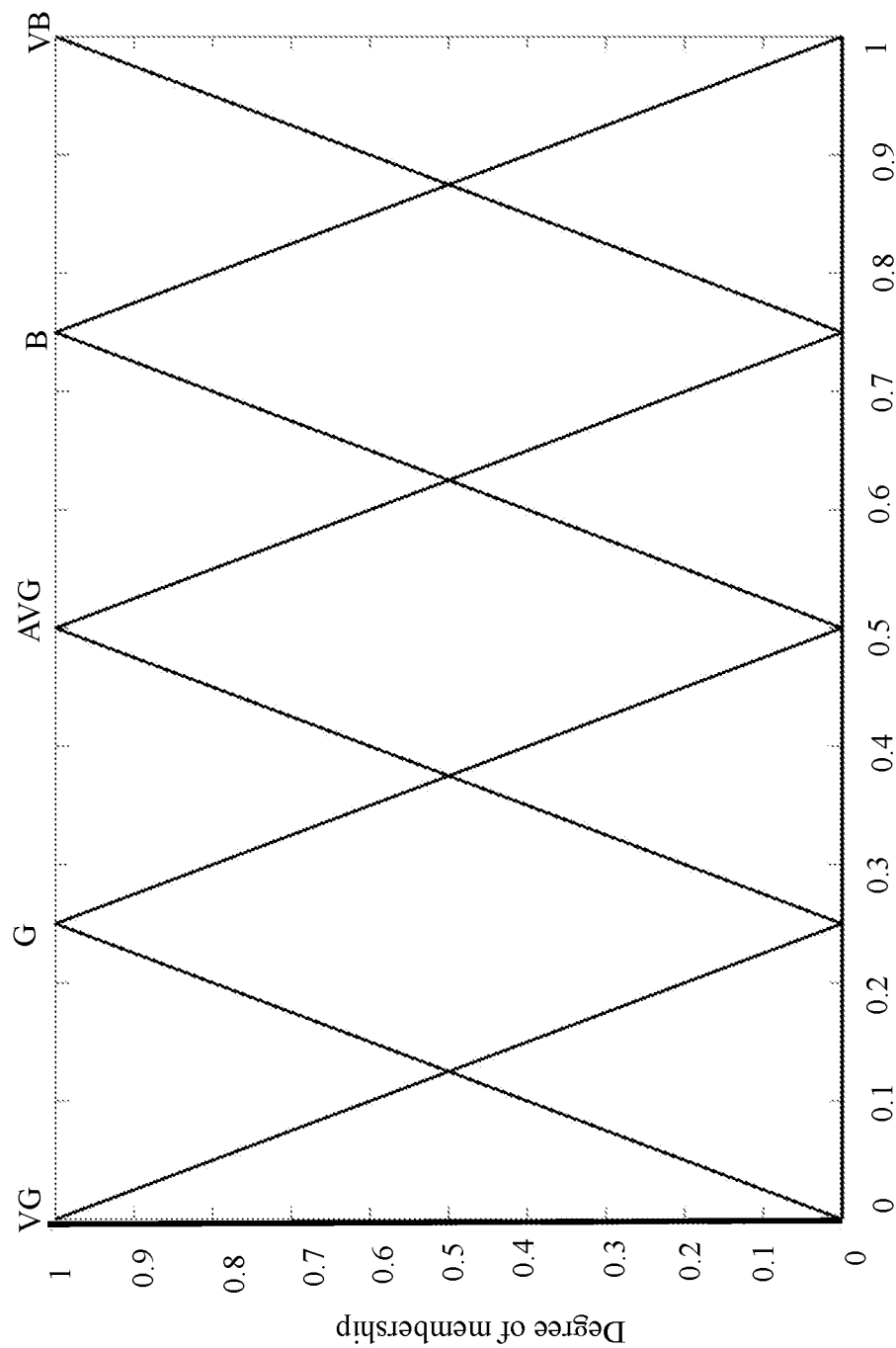

FIG. 3 depicts membership function plot for the output variable for method of trip classification, in accordance with some embodiments of the present disclosure.

In an embodiment, trip analysis is performed on 38 drivers, each driver has driven certain number of trips for some duration. In total, 3927 trips has been analyzed by the present disclosure and classified. Comparison between the results obtained from the fuzzy inference system and the density plots of acceleration of some trips of the driver are depicted in FIGS. 4 and 5.

Figure 4:
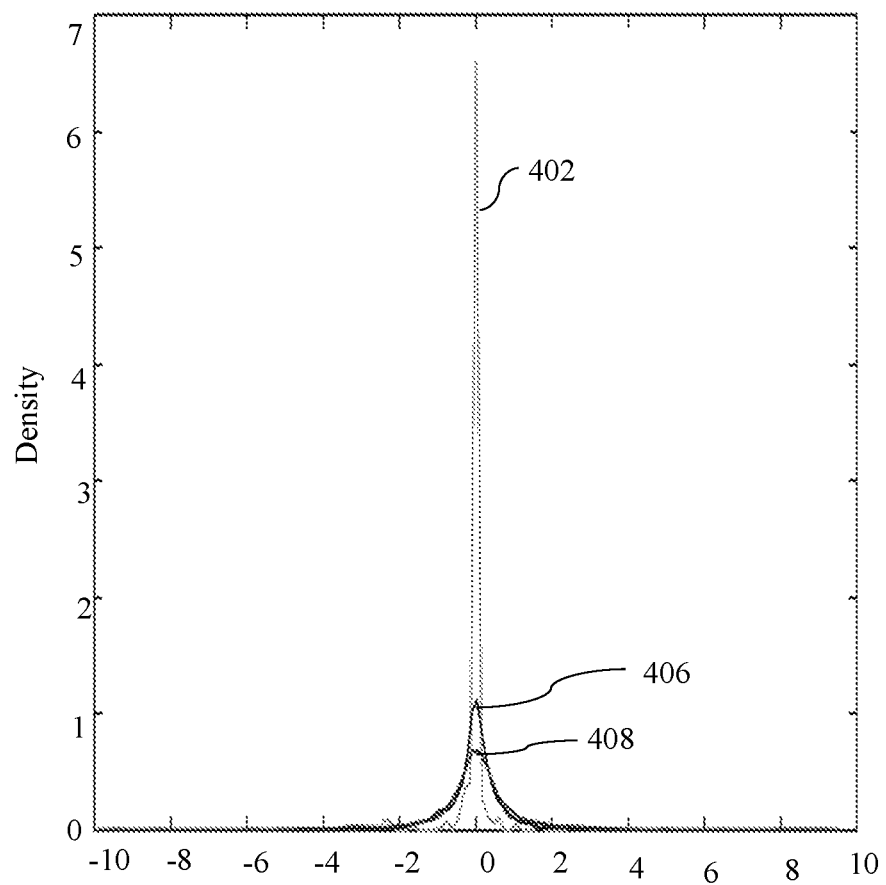
FIGS. 4 and 5 depicts density plots for the method for trip classification, in accordance with some embodiments of the present disclosure.

FIG. 4 depicts density plots for the acceleration of GOOD, AVERAGE and BAD trip for the method for trip classification, in accordance with some embodiments of the present disclosure. Now referring to FIG. 4, the plot 402 indicates the GOOD acceleration, 406 indicates the AVERAGE acceleration and 408 indicates the BAD acceleration.

Figure 5:
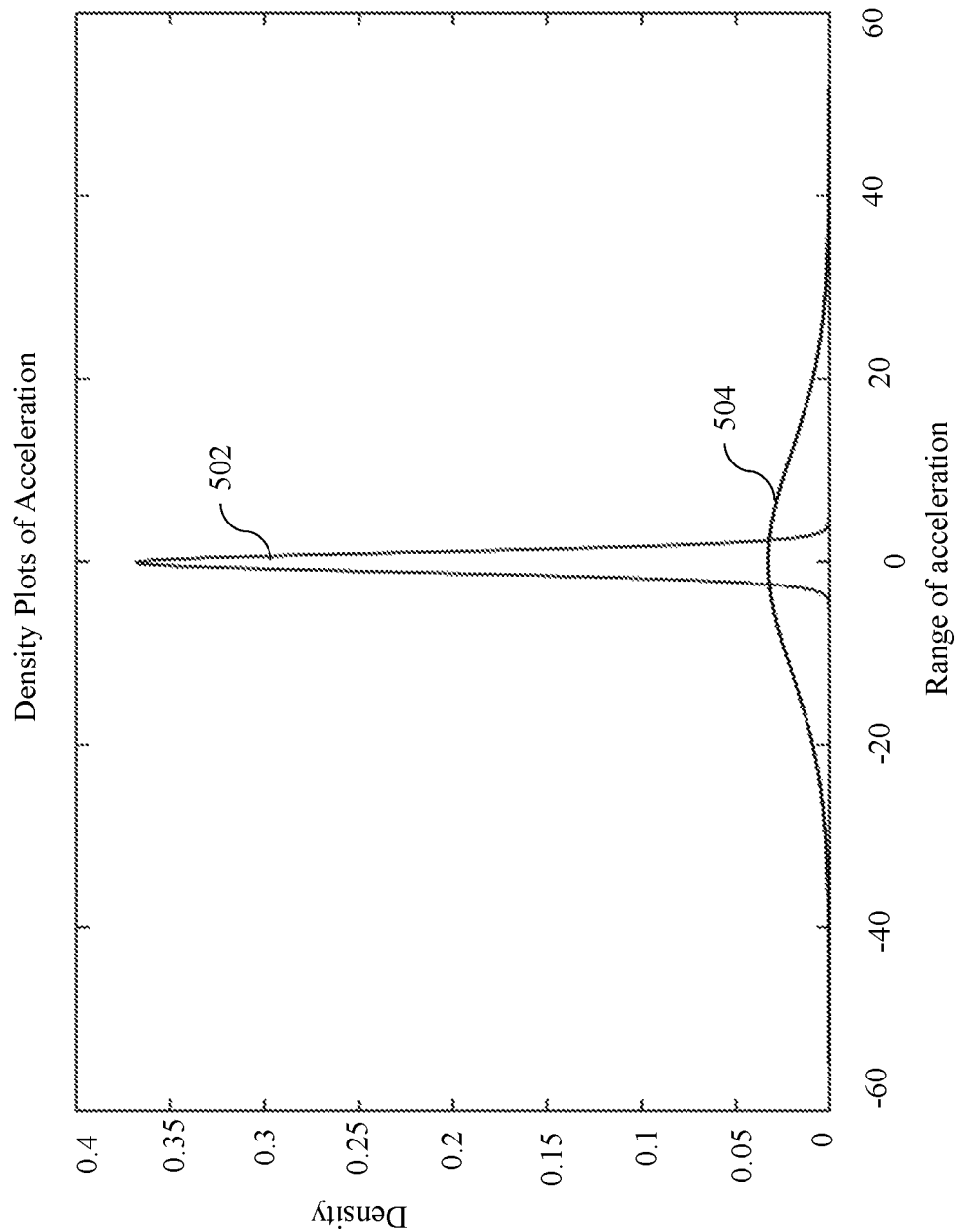

FIG. 5 depicts density plots for the acceleration of VERY GOOD and VERY BAD trip for the method for trip classification, in accordance with some embodiments of the present disclosure. Now referring to FIG. 5, the plot 502 indicates the VERY GOOD acceleration and the plot 504 indicates the VERY BAD acceleration.

In an embodiment, table 6 depicts the crisp values of all the inputs and the obtained fuzzy output with respective inference of Good, Average and Bad trip as plotted in FIG. 4.

TABLE 6

| H.BRAKE | CRUISE | H.ACC | JOURNEY.TY P | Fuzzy Inference |
|---|---|---|---|---|
| 0.006 | 0.9681 | 0.0046 | 0.2399 | Good |
| 0.0074 | 0.918 | 0.0066 | 0.4866 | Average |
| 0.0342 | 0.8333 | 0.0223 | 0.7067 | Bad |

From Table 6, if the crisp values of inputs are H.BRAKE=0.006, CRUISE=0.9681 and H.ACC=0.0046 then, according to inference system JOURNEY.TY P=0.2399. This value is mapped in range of Good which means the quality of driving in this trip is good. Same we can see in FIG. 3 that the highest number of economical acceleration is concentrated, which is considered to be as a good trip. Similarly, results for Average and Bad trip can also be compared.

In an embodiment, table 7 indicates the crisp values of all the inputs and the obtained fuzzy output with respective inference of Very Good and Very Bad trip are plotted in FIG. 5.

TABLE 7

| H.BRAKE | CRUISE | H.ACC | JOURNEY.TY P | Fuzzy Inference |
|---|---|---|---|---|
| 0 | 0.9681 | 0 | 0.0800 | Very Good |
| 0.0554 | 0.8364 | 0.0677 | 0.9000 | Very Bad |

Figure 6:
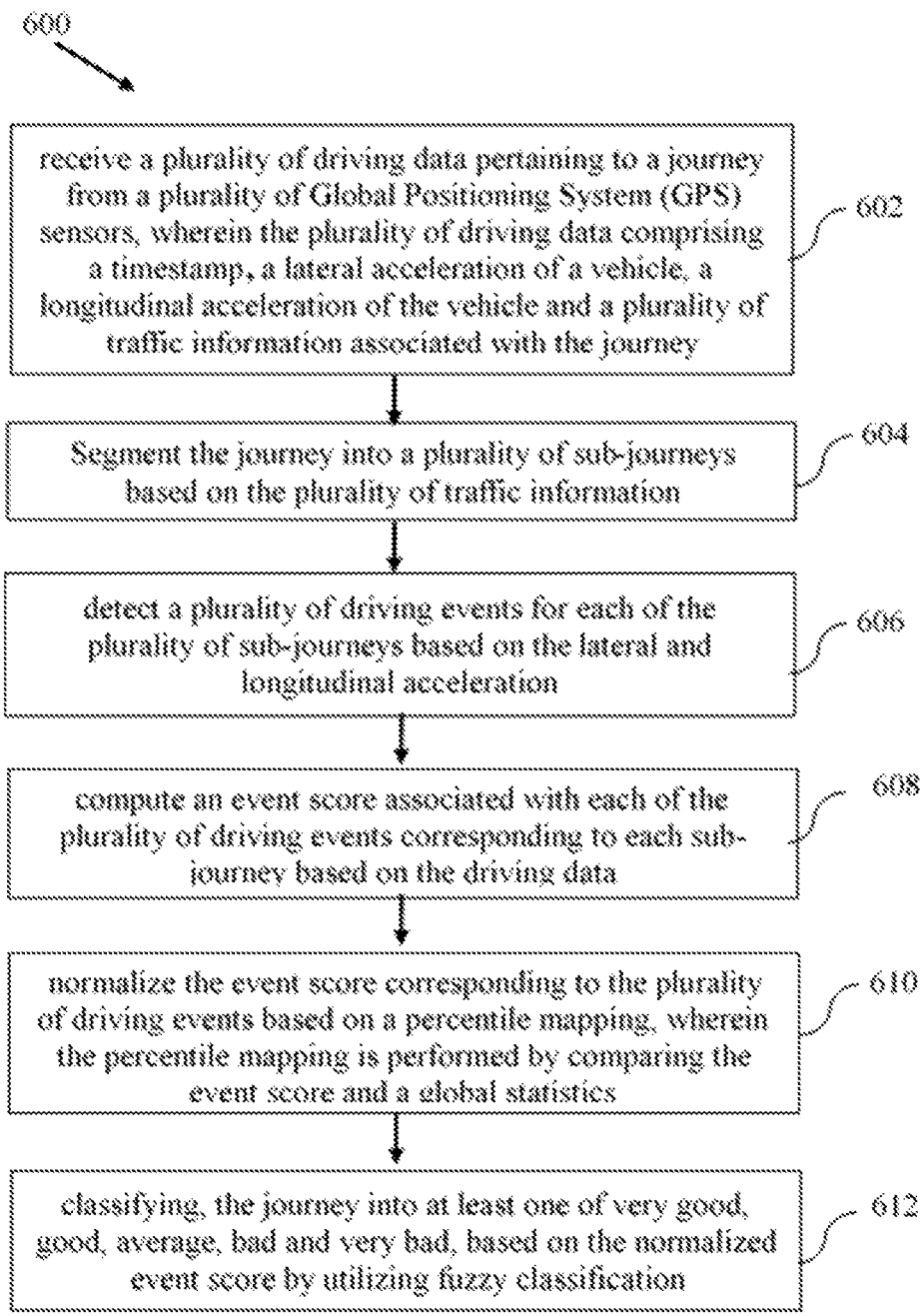
FIG. 6 is a flow diagram for the processor implemented method for trip classification, in accordance with some embodiments of the present disclosure.

FIG. 6 is a flow diagram for a processor implemented method for trip classification, in accordance with some embodiments of the present disclosure. The method 600 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 600 is described is not intended to be construed as a limitation, and any number of the described method blocks can be combined in any order to implement the method 600, or an alternative method. Furthermore, the method 600 can be implemented in any suitable hardware, software, firmware, or combination thereof. At 602, the system 100, receives, by a one or more hardware processors, the plurality of driving data pertaining to the journey from the plurality of Global Positioning System (GPS) sensors. The plurality of driving data comprising a timestamp, a lateral acceleration of a vehicle, a longitudinal acceleration of the vehicle and a plurality of traffic information associated with the journey. At 604, the system 100 Segment, by the one or more hardware processors, the journey into a plurality of sub-journeys based on the plurality of traffic information. The plurality of traffic information includes the capacity of the road, heavy traffic hours, types of vehicles, number of vehicles and vehicle density per unit length of road. The plurality of traffic information is obtained from a global database. At 606, the system 100 detects, by the one or more hardware processors, a plurality of driving events for each of the plurality of sub-journeys based on the lateral and longitudinal acceleration; wherein the plurality of driving events comprising a lane change, an abrupt turning and an overtake. At 608, the system 100 computes, by the one or more hardware processors, an event score associated with each of the plurality of driving events corresponding to each sub-journey based on the driving data. At 610, the system 100 normalizes, by the one or more hardware processors, the event score corresponding to the plurality of driving events based on a percentile mapping, wherein the percentile mapping is performed by comparing the event score and a global statistics. At 612, the system 100 classifies, by the one or more hardware processors, the journey into at least one of very good, good, average, bad and very bad, based on the normalized event score by utilizing fuzzy classification.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of end to end trip classification. Further, the present disclosure can be utilized to improve transportation safety and the driving experience as a whole. Furthermore, the system 100 can be incorporated into Advanced Driver Assistance System (ADAS). By coupling sensing information with accurate event prediction, the ADAS can prevent accidents by warning the driver ahead of time of potential danger by classifying the driving.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, the method comprising:
   receiving, by one or more hardware processors, a plurality of driving data pertaining to a journey from a plurality of Global Positioning System (GPS) sensors, wherein the plurality of driving data comprising a timestamp, a lateral acceleration of a vehicle, a longitudinal acceleration of the vehicle and a plurality of traffic information associated with the journey,. wherein the plurality of traffic information includes capacity of the road, heavy traffic hours, types of vehicles, number of vehicles and vehicle density per unit length of road, and wherein the plurality of traffic information is obtained from a global database;
   segmenting, by the one or more hardware processors, the journey into a plurality of sub- journeys based on the plurality of traffic information;
   detecting, by the one or more hardware processors, a plurality of driving events for each of the plurality of sub-journeys based on the lateral acceleration and the longitudinal acceleration;
   computing, by the one or more hardware processors, an event score associated with each of the plurality of driving events corresponding to each sub journey based on the driving data,. wherein the event score is computed based on number of times each driving event occurs corresponding to the each sub-journey, and wherein the plurality of driving events comprising a lane change, an abrupt turning and an overtake;
   normalizing, by the one or more hardware processors, the event score corresponding to the plurality of driving events based on a percentile mapping, wherein the percentile mapping is performed by comparing the event score and global statistics, and wherein normalizing the event score based on the percentile mapping comprises:
      obtaining a rounded off percentile score;
      if the percentile score is less than the event score, then the percentile score is taken without modification; and
      if the percentile score is greater than the event score, then incorporating Gaussian noise in the driving data to adjust the percentile score;
   calculating, by the one or more hardware processors, an overall acceleration for the journey by merging data associated with the plurality of sub-journeys together, wherein the calculation is performed separately on both the lateral acceleration and the longitudinal acceleration; and
   classifying, by the one or more hardware processors, the journey into at least one of "very good", "good", "average", "bad" and "very bad" based on the normalized event score by utilizing fuzzy classification, wherein classifying the journey by utilizing the fuzzy classification comprises the steps of:
      defining a plurality of inputs for the fuzzy classification, wherein representation of the plurality of inputs are performed by triangular membership function;
      performing fuzzification on the plurality of inputs, wherein the fuzzification includes mapping of the plurality of inputs to corresponding linguistic variables, wherein the linguistic variables break down crisp values in a plurality of linguistic variable ranges between 0 and 1, and wherein the plurality of linguistic variable ranges are associated with a degree of membership;
      constructing a rule-base for analyzing overall quality of driving in the journey, wherein consequence of each rule is obtained by combining firing strength and output membership function and aggregation of all the consequences produces an output distribution; and
      performing defuzzification of the output distribution by a centroidal method to provide a crisp value of an output, wherein the output classifies the journey and represents the overall quality of the driving in the journey.

2. A system comprising:
   at least one memory storing programmed instructions; and
   one or more hardware processors operatively coupled to the at least one memory, wherein the one or more hardware processors are capable of executing the programmed instructions stored in the at least one memory to:
   receive a plurality of driving data pertaining to a journey from a plurality of Global Positioning System (GPS) sensors, wherein the plurality of driving data comprising a timestamp, a lateral acceleration of a vehicle, a longitudinal acceleration of the vehicle and a plurality of traffic information associated with the journey, wherein the plurality of traffic information includes capacity of the road, heavy traffic hours, types of vehicles, number of vehicles and vehicle density per unit length of road, and wherein the plurality of traffic information is obtained from a global database;
segment the journey into a plurality of sub journeys based on the plurality of traffic information;
detect a plurality of driving events for each of the plurality of sub journeys based on the lateral and the longitudinal acceleration;
compute an event score associated with each of the plurality of driving events corresponding to each sub journey based on the driving data, wherein the event score is computed based on number of times each driving event occurs corresponding to the each sub-journey, and wherein the plurality of driving events comprising a lane change, an abrupt turning and an overtake;
normalize the event score corresponding to the plurality of driving events based on a percentile mapping, wherein the percentile mapping is performed by comparing the event score and global statistics, and wherein normalizing the event score based on the percentile mapping comprises:
  obtaining a rounded off percentile score;
  if the percentile score is less than the event score, then the percentile score is taken without modification; and
  if the percentile score is greater than the event score, then incorporating Gaussian noise in the driving data to adjust the percentile score;
calculate an overall acceleration for the journey by merging data associated with the plurality of sub journeys together, wherein the calculation is performed separately on both the lateral acceleration and the longitudinal acceleration; and
classify, the journey into at least one of "very good", "good", "average", "bad" and "very bad" based on the normalized event score by utilizing fuzzy classification, wherein classifying the journey by utilizing the fuzzy classification comprises:
  defining a plurality of inputs for the fuzzy classification, wherein representation of the plurality of inputs are performed by triangular membership function;
  performing fuzzification on the plurality of inputs, wherein the fuzzification includes mapping of the plurality of inputs to corresponding linguistic variables, wherein the linguistic variables break down crisp values in a plurality of linguistic variable ranges between 0 and 1, and wherein the plurality of linguistic variable ranges are associated with a degree of membership;
  constructing a rule-base for analyzing overall quality of driving in the journey, wherein consequence of each rule is obtained by combining firing strength and output membership function and aggregation of all the consequences produces an output distribution; and
  performing defuzzification of the output distribution by a centroidal method to provide a crisp value of an output, wherein the output classifies the journey and represents the overall quality of the driving in the journey.

3. One or more non-transitory machine readable information storage mediums comprising one or more instructions which when executed by one or more hardware processors causes:
receiving, by one or more hardware processors, a plurality of driving data pertaining to a journey from a plurality of Global Positioning System (GPS) sensors, wherein the plurality of driving data comprising a timestamp, a lateral acceleration of a vehicle, a longitudinal acceleration of the vehicle and a plurality of traffic information associated with the journey, wherein the plurality of traffic information includes capacity of the road, heavy traffic hours, types of vehicles, number of vehicles and vehicle density per unit length of road, and wherein the plurality of traffic information is obtained from a global database;
segmenting, by the one or more hardware processors, the journey into a plurality of sub- journeys based on the plurality of traffic information;
detecting, by the one or more hardware processors, a plurality of driving events for each of the plurality of sub-journeys based on the lateral acceleration and the longitudinal acceleration;
computing, by the one or more hardware processors, an event score associated with each of the plurality of driving events corresponding to each sub journey based on the driving data, wherein the event score is computed based on number of times each driving event occurs corresponding to the each sub-journey, and wherein the plurality of driving events comprising a lane change, an abrupt turning and an overtake;
normalizing, by the one or more hardware processors, the event score corresponding to the plurality of driving events based on a percentile mapping, wherein the percentile mapping is performed by comparing the event score and global statistics, and wherein normalizing the event score based on the percentile mapping comprises:
  obtaining a rounded off percentile score;
  if the percentile score is less than the event score, then the percentile score is taken without modification; and
  if the percentile score is greater than the event score, then incorporating Gaussian noise in the driving data to adjust the percentile score;
calculating, by the one or more hardware processors, an overall acceleration for the journey by merging data associated with the plurality of sub-journeys together, wherein the calculation is performed separately on both the lateral acceleration and the longitudinal acceleration; and
classifying, by the one or more hardware processors, the journey into at least one of "very good", "good", "average", "bad" and "very bad" based on the normalized event score by utilizing fuzzy classification, wherein classifying the journey by utilizing the fuzzy classification comprises the steps of:
  defining a plurality of inputs for the fuzzy classification, wherein representation of the plurality of inputs are performed by triangular membership function;
  performing fuzzification on the plurality of inputs, wherein the fuzzification includes mapping of the plurality of inputs to corresponding linguistic variables, wherein the linguistic variables break down crisp values in a plurality of linguistic variable ranges between 0 and 1, and wherein the plurality of linguistic variable ranges are associated with a degree of membership;
  constructing a rule-base for analyzing overall quality of driving in the journey, wherein consequence of each rule is obtained by combining firing strength and output membership function and aggregation of all the consequences produces an output distribution; and performing defuzzification of the output distribution by a centroidal method to provide a crisp value of an output, wherein the output classifies the journey and represents the overall quality of the driving in the journey.

* * * * *